United States Patent [19]
Stein et al.

[11] Patent Number: 5,526,789
[45] Date of Patent: Jun. 18, 1996

[54] INTERNAL COMBUSTION ENGINE INTAKE SYSTEM WITH VARIABLE TUNING

[75] Inventors: Robert A. Stein; William F. Stockhausen, both of Northville, Mich.

[73] Assignee: Ford Motor Company, Dearborn, Mich.

[21] Appl. No.: 434,217

[22] Filed: May 4, 1995

[51] Int. Cl.⁶ ..................................................... F02B 27/02
[52] U.S. Cl. .......................................... 123/432; 123/442
[58] Field of Search ......................... 123/184.34, 184.42, 123/306, 308, 403, 432, 442

[56] References Cited

U.S. PATENT DOCUMENTS

| | | | |
|---|---|---|---|
| 1,183,221 | 5/1916 | Miller et al. | 261/18.3 |
| 5,069,174 | 12/1981 | Simko | 123/193.5 |
| 5,267,543 | 12/1993 | Novak et al. | 123/306 |

OTHER PUBLICATIONS

SAE Technical Paper Series 920849 "Cosworth MBA Engine" C. J. Poole, R. J. Hancock and D. C. Cairns, copyright 1992.

*Primary Examiner*—Tony M. Argenbright
*Attorney, Agent, or Firm*—Jerome R. Drouillard; Roger L. May

[57] ABSTRACT

An intake system for a multicylinder internal combustion engine includes a plenum for supplying air to the engine's cylinder, a plenum throttle for admitting air into the plenum, a low speed runner extending between the plenum and at least one intake port formed in the cylinder head, a high speed runner extending between the plenum and the intake port, and a secondary throttle interposed between the runners and the intake port, such that the secondary throttle controls flow in both the high speed and low speed runners.

12 Claims, 3 Drawing Sheets

INTERNAL COMBUSTION ENGINE INTAKE SYSTEM WITH VARIABLE TUNING

BACKGROUND OF THE INVENTION

1. Field of the Invention

The present invention relates to control of air throttling through an engine using a combination of plenum and secondary throttles and low and high speed intake runners.

2. Disclosure Information

Secondary throttles located adjacent internal combustion engine intake ports are known to produce improved combustion stability, particularly at idle, as compared with conventional plenum throttle arrangements. This is particularly true with engines having large amounts of overlap between the intake and exhaust events. Improvement in idle stability and off-idle and light load combustion stability arises from the fact that the individual cylinder secondary throttles, which are also termed "load control port throttles," control the backflow of residual exhaust gas into the intake port during the overlap period, while allowing freer flow at high load, high RPM operation when the secondary throttles are open. Secondary throttles also provide improved transient driveability response when used with large volume intake manifolds. Although it is also known that a long, low speed runner and a short high speed runner could be combined with a secondary throttle and a plenum throttle, as in U.S. Pat. No. 5,267,543, which is assigned to the assignee of the present invention, it is not known with such an arrangement to have secondary throttles operate upon the air flowing through both the high and low speed runners.

It is an advantage of the present invention that an intake system according to this invention will produce excellent combustion stability and torque at all engine speeds, while also providing enhanced tuning and cylinder filling at high engine speeds. Because the present system provides high tumble at idle and part throttle conditions, more exhaust gas recirculation (EGR) can be tolerated, thereby promoting reduction in the emission of oxides of nitrogen ($NO_x$). Other advantages of the present invention will become apparent to the reader of this specification.

SUMMARY OF THE INVENTION

An intake system for a multicylinder internal combustion engine includes a plenum for supplying air to the engine cylinders, a plenum throttle for admitting air into the plenum, low and high speed runners extending between the plenum and at least one intake port formed in the cylinder head, and a secondary throttle interposed between the low and high speed runners and the intake port. The secondary throttle is movable from a first plurality of positions in which it cuts off flow in the high speed runner to a second plurality of positions in which the secondary throttle variably controls the flow of air in both runners. While in any one of the positions in which it cuts off flow in the high speed runner, the secondary throttle variably controls flow through the low speed runner. Each of the secondary throttles preferably comprises a rotary throttle having a generally cylindrical bore through which air flows into at least one intake port. The secondary throttle preferentially directs air to a portion of the port.

The present invention may be used with an intake port which is bifurcated or trifurcated so as to terminate two or three intake valves. Thus, as used herein, the term "bifurcated" means that two intake valves are used, and "trifurcated" means that three intake valves are used. Those skilled in the art will appreciate in view of this disclosure, moreover, that each of the intake valves may be serviced by a separate secondary throttle, or all may be serviced by a single secondary throttle. The present invention may also be used with a single intake valve with a divided port. According to yet another aspect of the present invention, the port may contain a flow divider which directs air flowing through the port, as well as a fuel injector which discharges fuel into the intake port. Note, however, that a flow divider need not be employed with a system according to the present invention.

The secondary throttle is positioned by a controller at an angle which is based upon sensed values of at least one engine operating parameter. The secondary throttle is controlled in response to movement of an accelerator pedal operated by a vehicle driver such that in the event that the accelerator pedal is depressed by an angle which is less than a threshold angle, the opening angle of the secondary throttle will be determined according to the accelerator pedal angle. In the event, however, that the accelerator is depressed to an extent greater than the threshold accelerator pedal angle, the opening angle of the secondary throttle will be controlled at a maximum value if the speed of the engine exceeds the threshold speed value. If the engine speed is less than the threshold speed value, the opening angle of the secondary throttle will be set to a fraction of the maximum value. According to yet another aspect of the present invention, a method for controlling an intake system for an automotive internal combustion engine having a plenum throttle and at least one secondary throttle includes the steps of sensing engine speed, sensing accelerator pedal angle, comparing sensed accelerator pedal angle with a predetermined threshold angle value, and comparing sensed engine speed with a predetermined threshold speed value. The angle of the secondary throttle is controlled as a function of the sensed accelerator pedal angle in the event that the sensed accelerator pedal angle is less than the threshold angle value. However, in the event that the sensed accelerator pedal angle exceeds the threshold angle value and the sensed engine speed is less than the threshold speed value, the angle of the secondary throttle will be set to a predetermined fractional value. Finally, in the event that the sensed accelerator pedal angle exceeds the threshold angle value and the sensed engine speed is greater than the threshold speed value, the angle of the secondary throttle will be set to its wide open position.

DETAILED DESCRIPTION OF THE PREFERRED EMBODIMENTS

Figure 1:
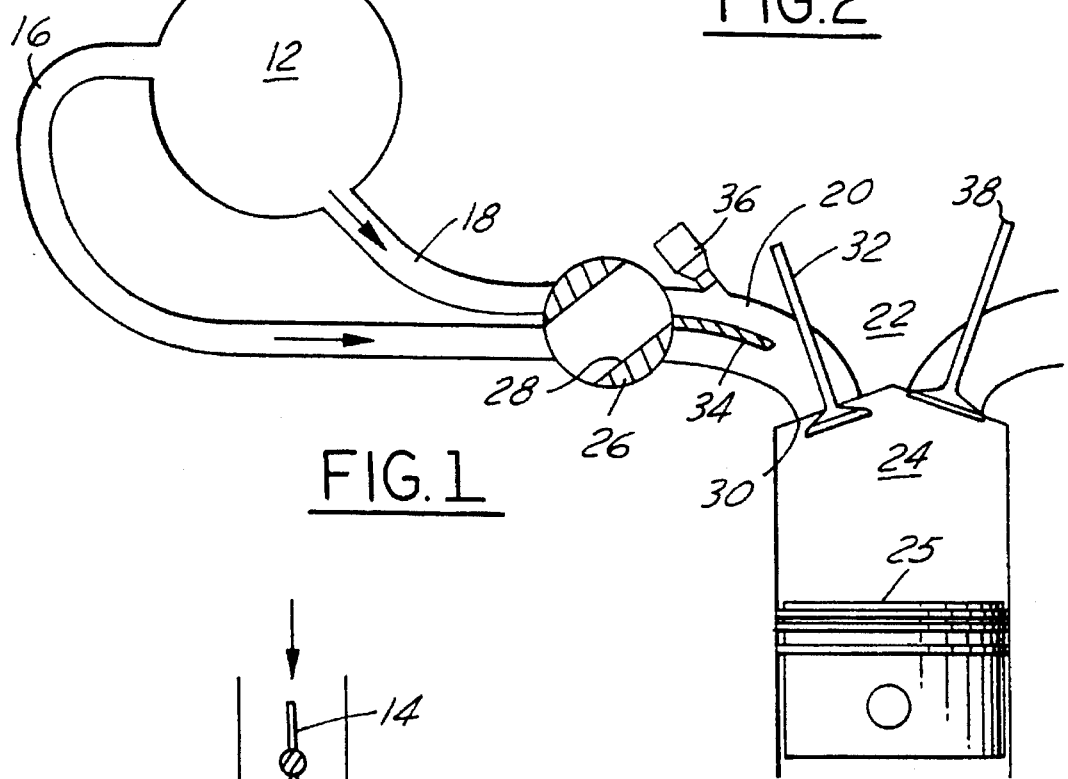
FIG. 1 is a schematic representation of a portion of a system according to the present invention, in which a secondary throttle is set in a part-throttle position.

As shown in FIG. 1, a reciprocating internal combustion engine with cylinder head 22 has piston 25 mounted in cylinder 24, and has an intake system in which air first passes over plenum throttle 14 and then enters plenum 12. From plenum 12, air passes into engine cylinder 24 through low speed runner 16 and high speed runner 18. Of course, a multicylinder engine would normally have at least one low speed runner and at least one high speed runner for each cylinder. Flow through low speed runner 16 and high speed runner 18 is controlled by both plenum throttle 14 and secondary throttle 26 in the following manner. Air flowing through low speed runner 16 and the high speed runner 18 may either be allowed to flow freely through only low speed runner 16, or through both of the runners, or through neither of the runners, in the event that a separate idle airflow control system is employed. When secondary throttle 26 is in the position shown in FIG. 1, airflow through high speed runner 18 is cut off, whereas airflow through low speed runner 16 is permitted through cylindrical bore 28, which extends through secondary throttle 26. Those skilled in the art will appreciate in view of this disclosure that bore 28 could comprise not only a cylindrical bore, but also other noncylindrical shapes such as ovoid or other shapes, according to the shape of the runners and ports through which flow is being controlled.

When secondary throttle 26 is in the position shown in FIG. 1, which is a small opening angle, it is noted that air is directed preferentially to the upper portion of intake port 20 past fuel injector 36 and over flow divider 34, thereby directing the air to the upper portion of the combustion chamber within cylinder 24, thereby improving tumble within cylinder 24. It is generally expected that plenum throttle 14 will be opened to a greater extent than secondary throttle 26, to assure that the pressure within plenum 12 remains approximately atmospheric.

Figure 3:
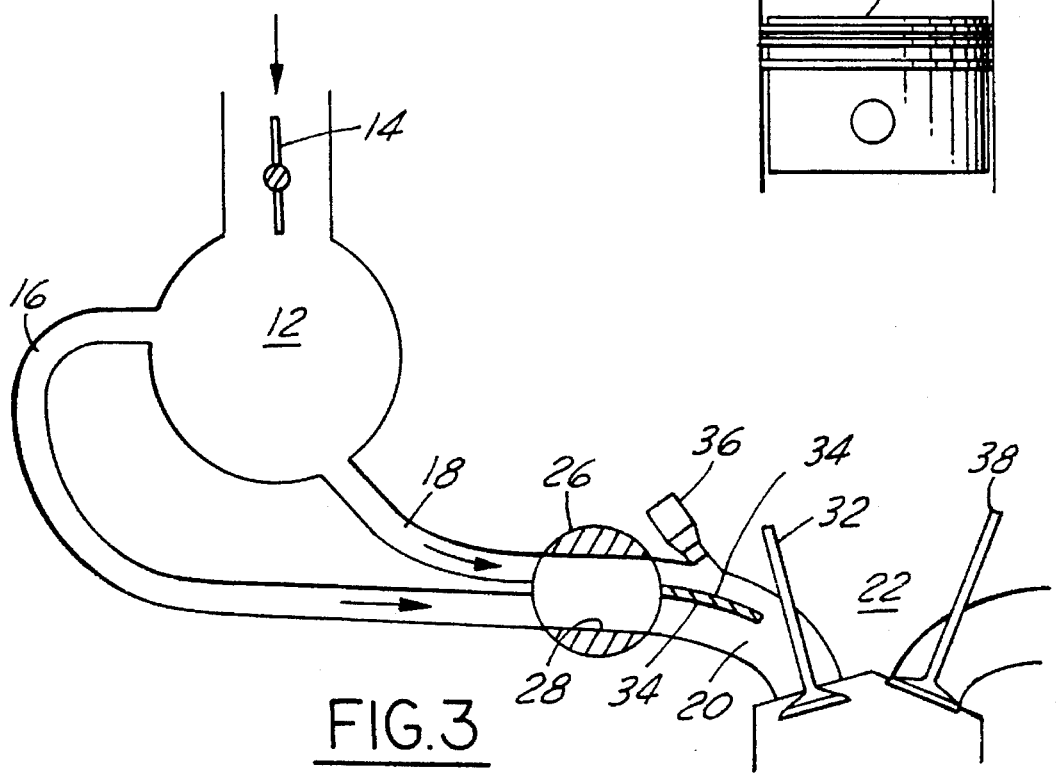
FIG. 3 is similar to FIG. 1, but shows a system according to the present invention with the plenum throttle set in a wide open position and a secondary throttle also set in the wide open position.

When secondary throttle 26 is moved to the position shown in FIG. 3, airflow through the engine will be at a maximum value, provided plenum throttle 14 is in the wide open position. In this case, it is assumed the engine is operating at a higher speed condition in which the presence of tumble induced by motion of air through the upper portion of port 20 in the vicinity of fuel injector 36 is of relatively less importance.

Figure 2:
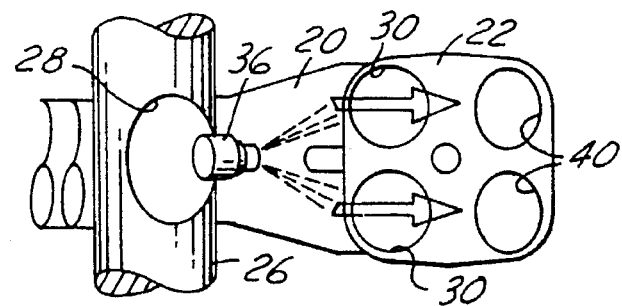
FIG. 2 is a plan view of the system shown in FIG. 1.

FIGS. 1 and 2 illustrate that a system according to the present invention may be used with multiple intake valves 32 mating on valve seats 30. Moreover, although FIG. 2 illustrates two exhaust valve seats 40, those skilled in the art will appreciate in view of this disclosure that a system according to the present invention could be used with a single exhaust port and exhaust valve 38, or multiple valves. The present invention could be used with three or more intake valves or only a single intake valve, too.

Figure 4:
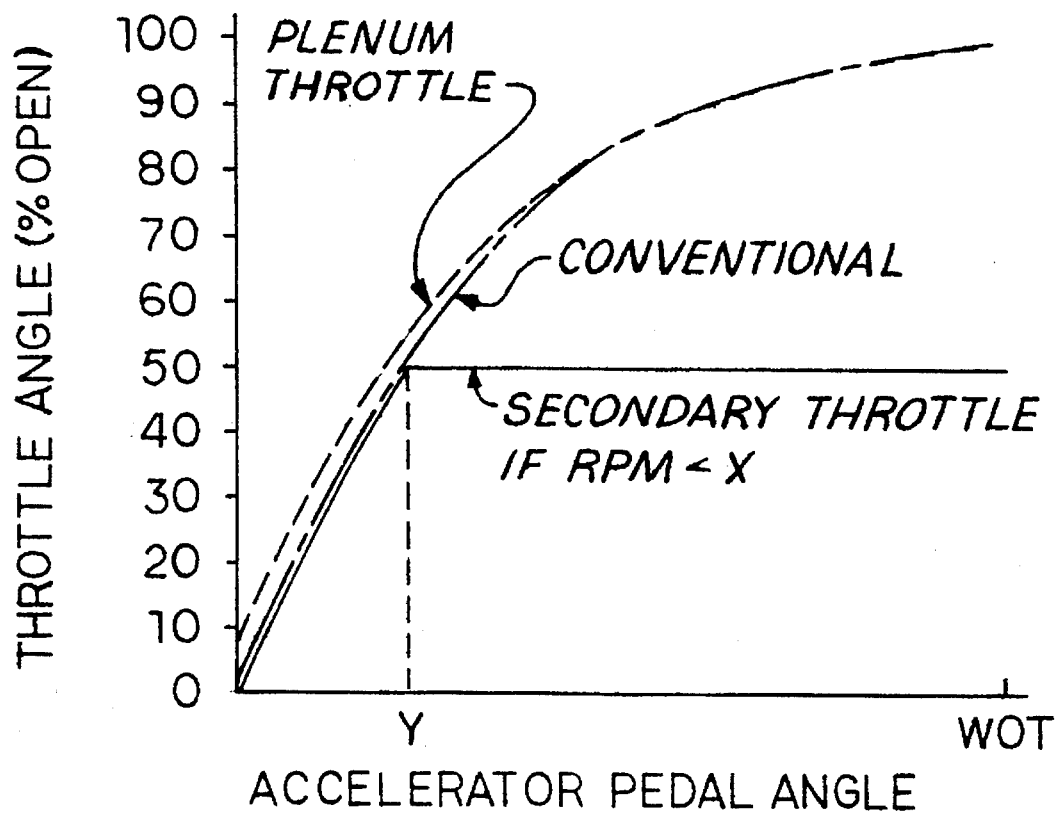
FIG. 4 is a graphical representation of various operating parameters in a system according to the present invention.
Figure 5:
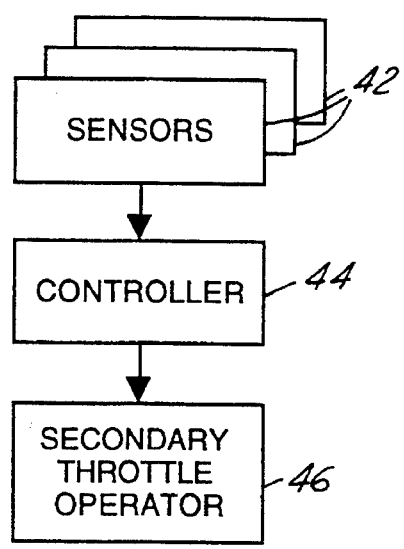
FIG. 5 is a block diagram showing hardware of a system according to the present invention.
Figure 6:
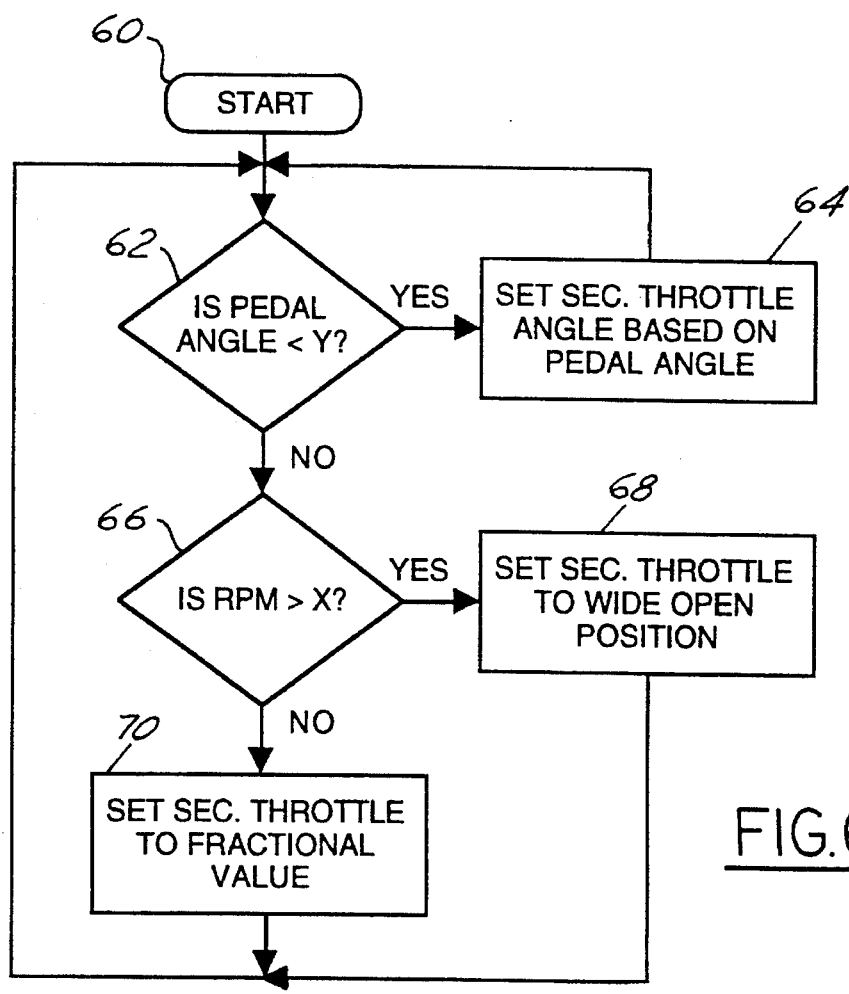
FIG. 6 is a flow chart illustrating certain aspects of the operation of a system according to the present invention.

FIG. 4 is a general representation of an algorithm which is shown in block diagram form in FIG. 6. This algorithm is performed by the system of FIG. 5 in which a plurality of sensors 42 sense values of engine operating parameters, such as accelerator pedal angle, engine speed, engine load, and other engine and vehicle operating parameters known to those skilled in the art and which may be employed by controller 44 in an algorithm for operating secondary throttle operator 46. Those skilled in the art will appreciate in view of this disclosure that secondary throttle operator 46 could comprise many types of servo mechanisms familiar to those in the art of engine control. Such devices include, without limitation, vacuum motors controlled by solenoids and driven by engine vacuum, stepper motors, torque motors, and other types of devices capable of positioning secondary throttle 26 at any desired location shown in FIGS. 1 or 3, or in any intermediate positions.

Turning now to FIG. 4, accelerator pedal angle is plotted on the abscissa, with throttle angle, measured in this case as percent open angle, being plotted on the ordinate. The position of plenum throttle 14 is shown as leading the position of secondary throttle 26. As accelerator pedal angle increases, plenum throttle 14 opens to a greater extent than does secondary throttle 26, with the result that air pressure within plenum 12 is maintained at approximately an atmospheric level. Note in FIG. 4 that as accelerator pedal angle reaches the opening position Y, secondary throttle 26 will be moved to the wide open position if engine RPM is greater than threshold value X. If, on the other hand, accelerator pedal angle exceeds the threshold angle Y but engine RPM is less than the threshold engine speed value X, secondary throttle 26 will be maintained in a 50% open position. Those skilled in the art will appreciate in view of this disclosure that secondary throttle 26 could be maintained in a variety of open angles and that 50% value is merely arbitrarily selected for the purpose of explaining the present invention, it being understood that the precise value of secondary throttle opening may depend upon engine load or engine speed, or other engine operating parameters. Those skilled in the art will further appreciate that secondary throttle 26 may be used to variably control the flow in both the low and high speed runners once secondary throttle 26 has reached the open position at which flow is permitted in both of the runners. Those skilled in the art will appreciate that the values of X and Y may be selected according to the needs of any particular engine to which a system according to the present invention is being applied. For example, engine speed threshold X may be selected to correspond to a point at which the engine's full load output torque is approximately the same value with either secondary throttle 26 or plenum throttle 14 in control of the airflow. Of course, in order for plenum throttle 14 to be in sole control of the airflow, secondary throttle 26 must be in the wide open position. Operation of a conventional single throttle system is also shown for reference in FIG. 4.

Operation of the present system according to one embodiment, which is shown graphically in FIG. 4, is further shown in the flow chart of FIG. 6. Thus, beginning at box 60, controller 44 compares the instantaneous pedal angle with the threshold value Y at box 62, and if accelerator pedal angle is less than threshold value Y, the routine moves to box 64 wherein the angle of the secondary throttle 26 is set to an angle based on the pedal angle. This is the portion of the curve of FIG. 4 which lies below accelerator pedal angle Y. If, however, the answer to the question posed in box 62 is "no," routine moves to box 66, wherein the instantaneous engine speed, which is often termed "RPM", or some average RPM which may be a time-weighted average or other function of engine RPM, is compared with the threshold engine speed value X. If the RPM value or engine speed value is greater than the threshold value X, the routine moves to box 68, wherein secondary throttle 26 is moved by secondary throttle operator 46, under the command of controller 44, to the wide open position. In the alternative, if the answer to the question posed on box 66 is "no," the routine moves to box 70 wherein the secondary throttle is set to a fractional value which is illustrated as being 50% in FIG. 4, but which, as explained earlier, may be selected from other values. Thus, controller 44 may control secondary throttle 26 to a predetermined fractional value in the event that engine speed is less than threshold speed X but accelerator pedal angle is greater than threshold value Y, whereas secondary throttle 26 will be moved to its wide open position in the event that both engine speed and accelerator pedal angle exceed their respective predetermined threshold values. In either case, it is seen that controller 44, acting through secondary throttle operator 46, is able to control the flow through both the high speed runners 18 and low speed runners 16 with a single set of secondary throttles, with at least one of the secondary throttles serving each of the engine's cylinders.

While the invention has been shown and described in its preferred embodiments, it will be clear to those skilled in the arts to which it pertains that many changes and modifications may be made thereto without departing from the scope of the invention.

We claim:

1. An intake system for a multicylinder internal combustion engine, comprising:

a plenum for supplying air to the engine cylinders;

a plenum throttle for admitting air into said plenum;

a low speed runner extending between the plenum and at least one intake port formed in a cylinder head;

a high speed runner extending between the plenum and said intake port; and a secondary throttle interposed between said runners and said at least one intake port, so as to control air flowing through both of said runners and into said intake port.

2. An intake system according to claim 1, wherein said secondary throttle is movable from a first plurality of positions in which it cuts off flow in the high speed runner while variably controlling flow through the low speed runner, to a second plurality of positions in which it variably controls the flow in both runners.

3. An intake system according to claim 1, wherein said secondary throttle comprises a rotary throttle having a generally cylindrical bore through which air flows into said at least one port, with said throttle directing air preferentially to a portion of said at least one port at small opening angles.

4. An intake system according to claim 1, wherein said at least one intake port is bifurcated and terminates with two intake valves.

5. An intake system according to claim 1, wherein said at least one intake port has a flow divider which directs air flowing through the port.

6. An intake system according to claim 5, wherein said flow divider and said secondary throttle direct air past a fuel injector which discharges fuel into said intake port.

7. An intake system according to claim 1, wherein said secondary throttle is positioned by a controller at an angle which is based upon sensed values of at least one engine operating parameter.

8. An intake system according to claim 1 wherein said secondary throttle is positioned by controller means in response to the movement of an accelerator pedal operated by a vehicle driver such that:

in the event that the accelerator pedal is depressed by an angle which is less than a threshold angle, the opening angle of the secondary throttle will be determined according to the accelerator pedal angle;

in the event that the accelerator is depressed greater than the threshold angle, the opening angle of the secondary throttle will be a maximum value if the speed of the engine exceeds a threshold speed value, but only a fraction of the maximum value if the engine speed is less than the threshold speed value.

9. An intake system according to claim 1, wherein said secondary throttle and said plenum throttle are positioned by controller means in response to the movement of an accelerator pedal operated by a vehicle driver such that:

in the event that the accelerator pedal is depressed by an angle which is less than a threshold angle, the opening angle of the plenum throttle and the secondary throttle will be determined according to the accelerator pedal angle such that the plenum throttle is opened sufficiently to maintain the plenum at approximately atmospheric pressure;

in the event that the accelerator is depressed greater than the threshold angle, the plenum throttle continuing to be operated such that its opening angle is determined according to the accelerator pedal angle, with the opening angle of the secondary throttle being held at a maximum value if the speed of the engine exceeds a threshold speed value, and with the opening angle of the secondary throttle being held at a fraction of the maximum value if the engine speed is less than the threshold speed value.

10. An intake system according to claim 1, wherein flow through said at least one intake port is controlled by a single intake valve.

11. A method for controlling an intake system for an automotive internal combustion engine having a plenum throttle, a least one low speed runner, at least one high speed runner, and at least one secondary throttle for controlling the flow of air through both the low and high speed runners, comprising the steps of:

sensing engine speed;

sensing accelerator pedal angle;

comparing sensed accelerator pedal angle with a predetermined threshold angle value;

comparing sensed engine speed with a predetermined threshold speed value; and controlling the angle of the secondary throttle:

1) as a function of the sensed accelerator pedal angle in the event that the sensed accelerator pedal angle is less than said threshold angle value;

2) in the event that the sensed accelerator pedal angle exceeds the threshold angle value and the sensed engine speed is less than the threshold speed value, setting the angle of the secondary throttle to a predetermined fractional value; and 3) in the event that the sensed accelerator pedal angle exceeds the threshold angle value and the sensed engine speed is greater than the threshold speed value, setting the angle of the secondary throttle to its wide open position.

12. An intake system for a multicylinder internal combustion engine, comprising:

a plenum for supplying air to the engine cylinders;

a plenum throttle for admitting air into said plenum;

a low speed runner extending between the plenum and at least one intake port formed in a cylinder head;

a high speed runner extending between the plenum and said intake port; and a secondary throttle interposed between said runners and said at least one intake port, so as to control air flowing through both of said runners and into said intake port, with said secondary throttle being movable from a first plurality of positions in which it cuts off flow in the high speed runner while variably controlling flow through the low speed runner in response to the movement of an accelerator pedal to an extent less than a threshold accelerator pedal angle, to a second plurality of positions in which it variably controls the flow in both runners.

\* \* \* \* \*